UNITED STATES PATENT OFFICE.

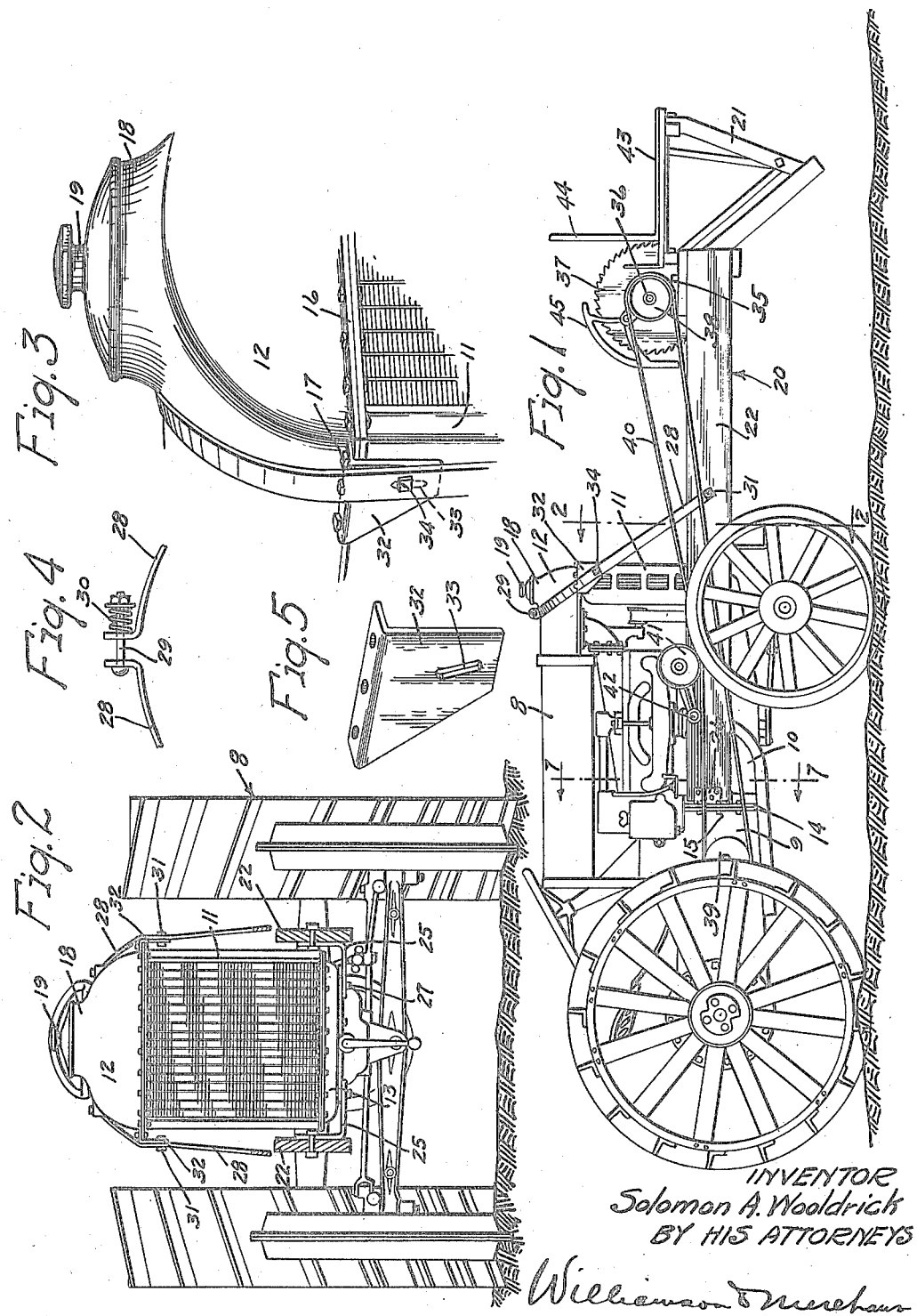

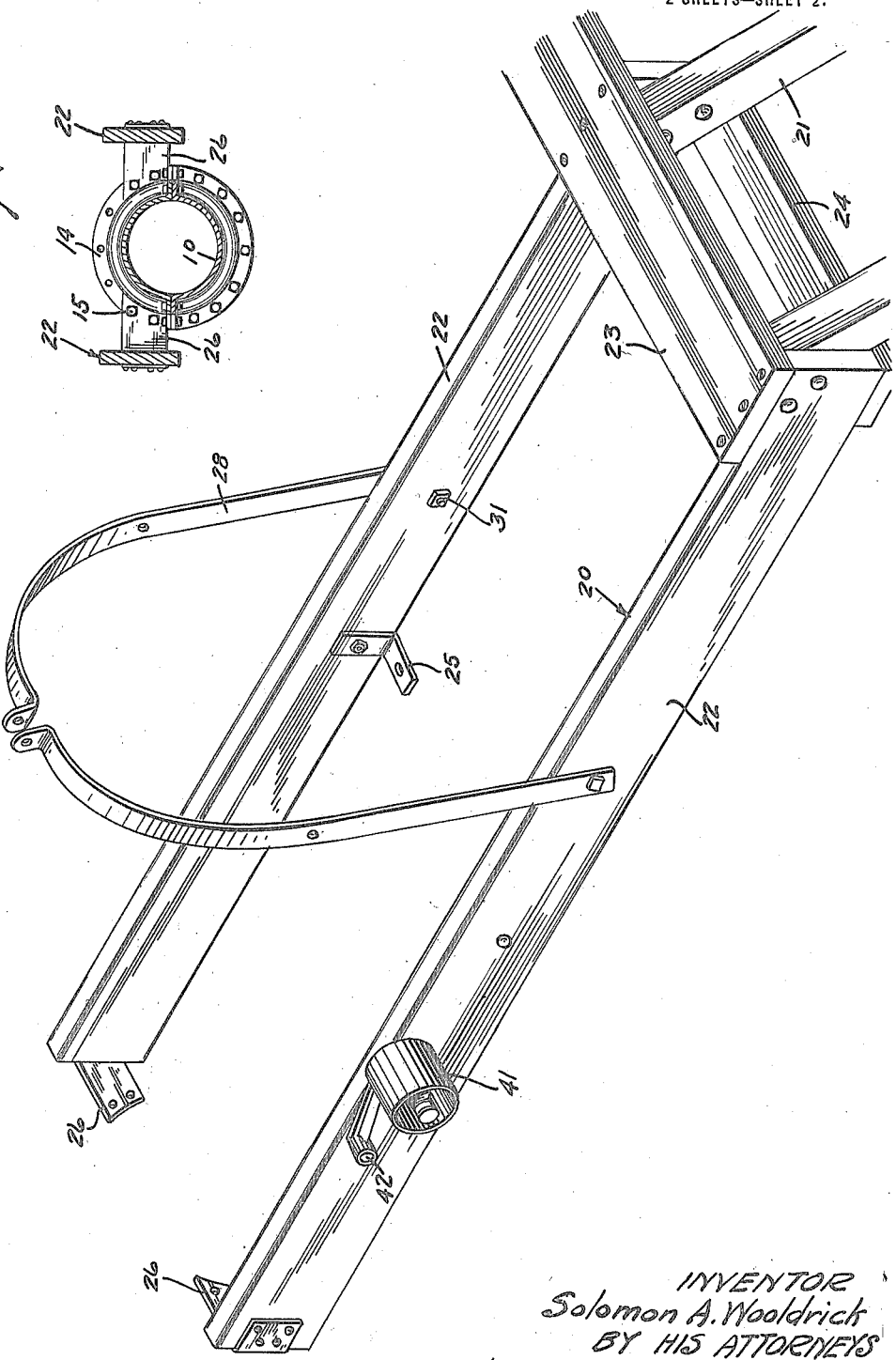

SOLOMON A. WOOLDRIK, OF SLEEPY EYE, MINNESOTA.

SAWING ATTACHMENT FOR TRACTORS.

1,416,923.  Specification of Letters Patent.  Patented May 23, 1922.

Application filed April 20, 1920. Serial No. 375,197.

*To all whom it may concern:*

Be it known that I, SOLOMON A. WOOLDRIK, a citizen of the United States, residing at Sleepy Eye, in the county of Brown and State of Minnesota, have invented certain new and useful Improvements in Sawing Attachments for Tractors; and I do hereby declare the following to be a full, clear, and exact description of the invention, such as will enable others skilled in the art to which it appertains to make and use the same.

My invention has for its object to provide a sawing attachment for tractors intended for general use, but especially adapted for application to a Fordson tractor.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of a Fordson tractor having the improved sawing attachment applied thereto;

Fig. 2 is a front end elevation of the tractor and sawing attachment, with some parts of the sawing attachment sectioned on the line 2—2 of Fig. 1;

Fig. 3 is a fragmentary perspective view of the front end of the tractor and hanger yoke;

Fig. 4 is a fragmentary view of the hanger yoke and the resilient device connecting the members thereof;

Fig. 5 is a perspective view of one of the hanger yoke brackets;

Fig. 6 is a perspective view of the main and supplemental frames removed from the tractor; and Fig. 7 is a transverse section taken on the line 7—7 of Fig. 1.

The improved sawing attachment, as shown, is applied to a Fordson tractor indicated as an entirety by the numeral 8, with the exception of the transmission housing 9, crank case 10, radiator 11, top radiator tank 12 and bottom radiator tank 13. The transmission housing 9 and crank case 10 have, at their abutting ends, outturned flanges 14 detachably connected by nut-equipped bolts 15. The radiator 11 and top radiator tank 12 are also provided with outturned flanges 16 detachably connected by nut-equipped bolts 17. In the top of the radiator tank 12 is a filling neck 18 normally closed by a cap 19.

The improved sawing attachment includes a main frame 20, and a supplemental frame 21, the former of which comprises a pair of laterally spaced side bars 22 having their forward ends rigidly connected at their upper edges by a sill 23, and at their lower edges by a tie-bar 24. The rear end portions of the frame side bars 22 are arranged to receive therebetween the front end portion of the tractor 8. To detachably secure the improved sawing attachment to the tractor 8, there is secured to the frame side bars 22 front angle brackets 25 and rear angle brackets 26. The front angle brackets 25 are secured to the bottom of the bottom radiator tank 13 by bolts 27, and the angle brackets 26 are secured to the flanges 14 by certain of the nut-equipped bolts 15.

To further support the improved sawing attachment from the tractor, there is provided a two-part hanger yoke 28 arranged to straddle the upper radiator tank 12 just back of the filling neck 18. The members of the hanger yoke 28 are resiliently connected by a nut-equipped bolt 29 and coiled spring 30. This bolt 29 is inserted through aligned bores in the outturned ends of the yoke members and the coiled spring 30 is compressed between one end of the bolt 29 and the outturned end of one of said members, as best shown in Fig. 4. The prongs of the yoke are extended forwardly and downwardly and are detachably secured to the frame side bars 22 considerably forward of the front brackets 25 by nut-equipped bolts 31. The hanger yoke 28 is held in this oblique position with freedom for slight endwise movement by means of brackets 32 secured to the flanges 16 by certain of the nut-equipped bolts 17 and provided with oblique slots 33 through which project nut-equipped bolts 34 inserted through bores in the members of the hanger yoke 28. Obviously, the filling neck 18 limits the forward movement of the yoke 28.

Secured to the sill 23 is a pair of bearings 35, in which is journaled a shaft 36, to which is secured a circular saw 37 and a belt pulley 38 aligned with a belt pulley 39 driven by suitable connections from the transmission shaft of the tractor. A belt 40 is arranged to run over the pulleys 38 and 39, and a belt tightener 41 is pivoted at 42 to the right-hand frame side bar 22 for vertical swinging movement and rests, under the action of gravity, on the upper run of the belt 40.

Wood is fed to the saw 37 by means of a table 43 movably mounted on the supplemental frame 21 and provided with uprights 44, against which the wood is held when fed to the saw. A suitable guard 45 is provided for the saw 37.

The purpose of resiliently supporting the main frame 20 forward of the tractor by means of the yoke 28, bolt 29 and spring 30, is to absorb the shocks produced by throwing wood onto saw table 43.

From the above description, it is evident that the improved sawing attachment may be very quickly and easily attached to a tractor without mutilating or changing any of the parts thereof.

What I claim is:

1. A sawing attachment for tractors including a frame affording an end extension for a tractor, means detachably supporting the frame from the tractor, a two-part hanger yoke adapted to straddle the tractor and having its ends secured to the frame forward of the tractor, resilient means connecting the members of the yoke, means intermediately supporting the yoke in an oblique position from the tractor with freedom for endwise movement, a saw mounted on the frame outward of the yoke, and means for driving the saw from the tractor.

2. An attachment for tractors comprising a frame extending from one end of the tractor, said frame being detachably supported from the tractor at each side thereof, a two-part hanger yoke adapted to straddle the front end of a tractor and having its ends secured to the frame forward of the tractor, resilient means connecting the members of the yoke whereby the frame is yieldingly supported thereby, a driven device mounted on the frame outward of the yoke, and means for driving said device from the tractor.

In testimony whereof I affix my signature in presence of two witnesses.

SOLOMON A. WOOLDRIK.

Witnesses:
J. A. HERZOG,
FRANK HERZOG.